(12) United States Patent
Srikumar et al.

(10) Patent No.: US 8,712,567 B2
(45) Date of Patent: Apr. 29, 2014

(54) MANUFACTURED PRODUCT CONFIGURATION

(75) Inventors: Kesavan Srikumar, Cupertino, CA (US); Frank Pong, Los Gatos, CA (US)

(73) Assignee: Aviat U.S., Inc., Santa Clara, CA (US)

( * ) Notice: Subject to any disclaimer, the term of this patent is extended or adjusted under 35 U.S.C. 154(b) by 146 days.

(21) Appl. No.: 11/615,911

(22) Filed: Dec. 22, 2006

(65) Prior Publication Data
US 2008/0154417 A1    Jun. 26, 2008

(51) Int. Cl.
*G06F 19/00* (2011.01)

(52) U.S. Cl.
USPC ........................................... 700/105; 700/117

(58) Field of Classification Search
USPC ............... 700/95, 97, 98, 105, 108–110, 102, 700/117, 118, 182; 702/81, 82, 84, 83, 85, 702/105, 108, 182–185; 703/1, 6, 7
See application file for complete search history.

(56) References Cited

U.S. PATENT DOCUMENTS

| | | | |
|---|---|---|---|
| 5,610,807 A | | 3/1997 | Kanda et al. |
| 5,809,287 A | * | 9/1998 | Stupek et al. ................... 703/22 |
| 5,867,714 A | * | 2/1999 | Todd et al. ..................... 717/172 |
| 5,960,189 A | * | 9/1999 | Stupek et al. ................. 717/169 |
| 6,154,738 A | * | 11/2000 | Call ................................ 705/20 |
| 6,202,070 B1 | * | 3/2001 | Nguyen et al. ..................... 1/1 |
| 6,223,092 B1 | * | 4/2001 | Miyakawa et al. ............ 700/103 |
| 6,282,709 B1 | * | 8/2001 | Reha et al. .................... 717/175 |
| 6,563,269 B2 | | 5/2003 | Robinett et al. |
| 6,647,304 B2 | * | 11/2003 | Tsukishima et al. ............. 700/95 |
| 6,735,490 B2 | * | 5/2004 | Anand et al. .................... 700/97 |
| 6,802,659 B2 | * | 10/2004 | Cremon et al. ................. 400/76 |
| 6,804,569 B1 | * | 10/2004 | Hirano et al. ................. 700/108 |
| 6,809,292 B2 | | 10/2004 | Spear et al. |
| 6,922,599 B2 | * | 7/2005 | Richey ............................ 700/98 |
| 6,924,459 B2 | | 8/2005 | Spear et al. |

(Continued)

FOREIGN PATENT DOCUMENTS

| | | |
|---|---|---|
| EP | 1657610 A2 | 5/2006 |
| WO | WO 2004/014274 A2 | 2/2004 |

(Continued)

OTHER PUBLICATIONS

PCT International Search Report and Written Opinion dated Jul. 25, 2008 for International Application No. PCT/US07/87654.

(Continued)

*Primary Examiner* — Charles Kasenge
(74) *Attorney, Agent, or Firm* — Sheppard, Mullin, Richter & Hampton LLP

(57) ABSTRACT

One aspect related to design of systems and methods for manufacture of products is configuration. More particularly, this relates to verification of an existing configuration and to reconfiguration of a product following manufacturing. The present invention contemplates an approach to designing a station capable of configuration verification and reconfiguration and of preventing shipment of a product if an undesirable configuration is detected. A preferred approach also includes guiding the operator to take possible remedial action. The preferred approach further includes storing various types of data needed for the verification and reconfiguration in a server, thereby making such data substantially instantly accessible for verification and reconfiguration purposes. Such data preferably includes software capable of adapting the functions of the station itself, i.e., the tasks to be performed at the configuration verification and reconfiguration station. A system design using this approach is particularly useful in the manufacture of a microwave radio.

20 Claims, 5 Drawing Sheets

(56) References Cited

U.S. PATENT DOCUMENTS

| | | |
|---|---|---|
| 6,934,671 B2 | 8/2005 | Bertsch et al. |
| 6,954,929 B2 * | 10/2005 | Erickson et al. ............... 717/173 |
| 7,031,901 B2 * | 4/2006 | Abu El Ata ........................ 703/1 |
| 7,065,461 B2 * | 6/2006 | Chang et al. ..................... 702/81 |
| 7,092,902 B2 * | 8/2006 | Eldridge et al. ................. 705/80 |
| 7,099,803 B1 * | 8/2006 | Rappoport et al. ................. 703/1 |
| 7,149,677 B2 * | 12/2006 | Jayaram et al. .................. 703/22 |
| 7,376,870 B2 * | 5/2008 | Kataria et al. .................. 714/47.1 |
| 7,389,504 B2 * | 6/2008 | Kawano et al. ................. 717/171 |
| 7,461,008 B2 * | 12/2008 | Garrow et al. ................ 705/7.22 |
| 7,593,872 B2 * | 9/2009 | Eldridge et al. ............ 705/26.35 |
| 7,668,612 B1 * | 2/2010 | Okkonen ......................... 700/95 |
| 7,822,499 B2 * | 10/2010 | Nakamura ....................... 700/97 |
| 8,225,414 B2 * | 7/2012 | Raley et al. ..................... 726/27 |
| 2001/0043113 A1 | 11/2001 | Hoshino et al. |
| 2002/0095491 A1 * | 7/2002 | Edmonds et al. ............. 709/224 |
| 2003/0020512 A1 * | 1/2003 | Mantey et al. .................. 326/38 |
| 2003/0055736 A1 * | 3/2003 | Eldridge et al. ................ 705/26 |
| 2003/0135846 A1 * | 7/2003 | Jayaram et al. ............... 717/137 |
| 2004/0088695 A1 * | 5/2004 | Kawano et al. ............... 717/171 |
| 2004/0088696 A1 * | 5/2004 | Kawano et al. ............... 717/171 |
| 2004/0106404 A1 * | 6/2004 | Gould et al. .................. 455/431 |
| 2004/0181486 A1 * | 9/2004 | Eldridge et al. ................ 705/50 |
| 2004/0214097 A1 | 10/2004 | Suttile et al. |
| 2005/0004821 A1 * | 1/2005 | Garrow et al. ..................... 705/7 |
| 2005/0113949 A1 | 5/2005 | Honda et al. |
| 2005/0114059 A1 * | 5/2005 | Chang et al. .................... 702/84 |
| 2005/0204353 A1 * | 9/2005 | Ji ................................... 717/168 |
| 2005/0256598 A1 | 11/2005 | Mata et al. |
| 2005/0278793 A1 * | 12/2005 | Raley et al. ..................... 726/28 |
| 2005/0283392 A1 * | 12/2005 | Garrow et al. ..................... 705/8 |
| 2006/0052892 A1 * | 3/2006 | Matsushima et al. ........... 700/98 |
| 2006/0085087 A1 | 4/2006 | Hass et al. |
| 2006/0142887 A1 | 6/2006 | Huang et al. |
| 2006/0149407 A1 | 7/2006 | Markham et al. |
| 2006/0200261 A1 | 9/2006 | Monette et al. |
| 2008/0022087 A1 * | 1/2008 | Tsujimoto ..................... 713/155 |

FOREIGN PATENT DOCUMENTS

| | | |
|---|---|---|
| WO | WO 2004/014274 A3 | 1/2005 |
| WO | WO 2005/008349 A1 | 1/2005 |
| WO | WO 2005/017790 A1 | 2/2005 |

OTHER PUBLICATIONS

PCT International Search Report and Written Opinion dated May 8, 2008 for International Application No. PCT/US2007/87650, 9 pages.
PCT International Search Report and Written Opinion dated Jun. 17, 2008 for International Application No. PCT/US2007/081561, 12 pages.
European Patent Application No. 07865710.3, Search Report dated Apr. 11, 2011.
Singapore Patent Application No. 200904290-4, Written Opinion dated Apr. 6, 2011.
European Patent Application No. 07865710.3, Examination Report dated Jul. 19, 2013.
European Patent Application No. 07865714.5, Examination Report dated Jun. 19, 2013.
European Patent Application No. 07865714.5, Search Report dated Oct. 7, 2011.

* cited by examiner part a part b

MANUFACTURED PRODUCT CONFIGURATION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This invention is generally related to manufacturing and, more specifically, to configuration of manufactured products, such as microwave radios.

BACKGROUND

Manufacturing of products includes processing of subassemblies at multiple production stations with each station designated, for instance, to one or more of assembly, testing, branding, and configuration. Many products to be assembled include multiple subassemblies, one or more of which are capable of being configured in multiple ways. Configuration may occur at any stage of a manufacturing process, for instance, of a subassembly prior to or during incorporation into a product, or of a fully assembled product. Frequently, the existing configuration of a product needs to be verified and possibly altered to a desired configuration before the product can be shipped to a particular customer or destination.

Pre-shipment configuration verification requires access to data associated with both the existing configuration and the desired configuration to allow for a comparison. The desired configuration may include private labeling, or a downgrade of software installed on the product, for example, so that a customer can purchase spare or replacement products compatible with products previously purchased. The desired configuration may further include aspects such as configuring a radio product to operate within a permissible frequency band depending on the target destination. In addition, a seller of a product may often want to customize the configuration of a product to conform to the customer's licensing terms of software installed on the product.

If the desired and existing configurations do not match, the product typically needs to be reconfigured. To avoid mistakes, it is further desirable to verify the configuration of the product again following reconfiguration.

Some products include technology in particularly skilled areas. Examples of skilled areas of technology include radio frequency and microwave technologies in products such as microwave radios, medical devices such as X-ray, CAT (computed axial tomography) or MRI (magnetic resonance imaging) machines, or fiber optics systems. Errors in the configuration of a product may result, after shipment, in unacceptable performance, liability for failing to conform to regulations or standards, or other anticipated or unanticipated problems. In some skilled areas of technology, such as those involved in medical devices, errors may cause physical harm.

Therefore, there is a need to consider the foregoing in the design of manufacturing systems and methods and the benefit of verifying configurations and of reconfiguring products following manufacturing, such as prior to shipment. One desired aspect of such design might be to substantially increase accessibility of data and software used for such verification and reconfiguration purposes.

SUMMARY

The present invention addresses these and related aspects of designing manufacturing systems and methods. In particular, the present invention contemplates design of systems for verifying configurations of products incorporating skilled areas of technology. A preferred approach includes storing, in a server, data associated with a manufactured product during substantially all stages of the manufacturing, and making data in the server substantially instantly accessible at the configuration verification station. This includes retrieving data from units (e.g., components, subassemblies) of a product, comparing such data with server data associated with the product, and verifying that the product is configured as desired. At the time of verification of the configuration at the station, the product has been manufactured and the units have been incorporated into the manufactured product. The verification helps prevent shipment of a product if a configuration is detected that is incorrect for the customer. The verification may also take place after the product has been shipped, for example, as part of troubleshooting a product during field service or customer repair. Preferably, this approach also includes guiding an operator to take remedial action, such as to reconfigure the product or to replace a unit thereof with a properly configured unit. Reconfiguration may be performed at a separate reconfiguration station or at a combined configuration verification and reconfiguration station. The preferred approach further allows for remotely controlling the configuration of the station itself. A system design using this approach is particularly useful in configuring outdoor units of a split-mount microwave radio system following manufacturing.

This system design provides a number of possible advantages. Among them is the ability to configure, from a remote location, the tasks the configuration verification and reconfiguration station is to perform and how it performs them. The configuration of the station itself includes remotely developing software for use on the station and making such software available for download, or causing such software to be downloaded, to the station. Storing data retrieved, generated and updated from production stations at substantially all stages or the manufacturing flow in the server increases the accessibility of data and software needed for verification and reconfiguration and substantially reduces the likelihood of errors. The system design allows for traceability of configuration information associated with products shipped. The design thus achieved is portable to and capable of being duplicated at any CM (contract manufacturer) with low requirements for maintenance and training of new operators.

Accordingly, for the purpose of the invention as shown and broadly described herein, the present invention is directed to a system and method for configuration verification and reconfiguration. In accordance with one embodiment, a station for verifying configuration of manufactured products with one or more units that incorporate technology in a skilled area comprises: a data retrieval component operative to retrieve from a unit an actual configuration revision, this unit having been incorporated into a manufactured product comprising at least one unit, including this unit, that incorporates technology in a skilled area, the data retrieval component being further operative to retrieve a desired configuration revision from a pick slip, a data access component operative to obtain from a server the actual and desired configuration revisions, the data access component having substantially instant access to the actual and desired configuration revisions once such revisions are written in the server, and a configuration verification component operative to compare the actual configuration revision, retrieved from the unit or obtained from the server, with the desired configuration revision, retrieved from the pick slip or obtained from the server, and to generate an output based on the comparison, wherein the output indicates whether the actual configuration revision should be accepted for this unit or not.

Such station may further include a data writing component operative to write the retrieved data in the server and the obtained data to the unit. Moreover, the station may comprise a printing component to print the configuration revisions and the generated output.

A variation of the station may include means for retrieving from a unit an actual configuration revision, this unit having been incorporated into a manufactured product comprising at least one unit, including this unit, that incorporates technology in a skilled area, and for retrieving a desired configuration revision from a pick slip, means for obtaining from a server the actual and desired configuration revisions, having substantially instant access to the actual and desired configuration revisions once such revisions are written in the server, and means for comparing the actual configuration revision, retrieved from the unit or obtained from the server, with the desired configuration revision, retrieved from the pick slip or obtained from the server, and for generating an output based on the comparison, wherein the output indicates whether the actual configuration revision should be accepted for this unit or not.

In accordance with another embodiment, a station for reconfiguration of manufactured products with one or more units that incorporate technology in a skilled area comprises: a data download component operative to download from a server software compatible with a desired configuration revision of a unit having been incorporated into a manufactured product comprising at least one unit, including this unit, that incorporates technology in a skilled area, the data download component having substantially instant access to the software once such software is written in the server, and a data download writing component operative to write the downloaded software to the unit.

In accordance with yet another embodiment, a station for verifying configuration or for reconfiguration of manufactured products with one or more units that incorporate technology in a skilled area comprises at least one component operative to obtain from the server software, instructions, and specifications associated with a production function of the station including one or more of verification of configuration and reconfiguration of a manufactured product, the manufactured product comprising at least one unit that incorporates technology in a skilled area, the software, instructions, and specifications being substantially instantly accessible to the at least one component once such software, instructions, and specifications are written in the server. The obtaining from the server may be initiated at the station or at the company.

In accordance with a further embodiment, a method for verifying configuration of manufactured products with one or more units that incorporate technology in a skilled area comprises: retrieving from a unit or obtaining from a server an actual configuration revision associated with this unit which has been made a part of a manufactured product comprising at least one unit, including this unit, that incorporates technology in a skilled area, retrieving from a pick slip or obtaining from the server a desired configuration revision associated with this unit, with the manufactured product, or with the pick slip, comparing the actual configuration revision, retrieved from the unit or obtained from the server, with the desired configuration revision, retrieved from the pick slip or obtained from the server, and generating an output based on the comparison, wherein the actual and desired configuration revisions are substantially instantly accessible once such revisions are written in the server, and wherein the output indicates whether the actual configuration revision should be access for this unit or not. If the actual configuration revision is accepted, the method may additionally include forwarding the product to a next step in a manufacturing process, printing a shipping label, or writing a serial number in the server. If the actual configuration revision is not accepted, the method may additionally include returning the unit to the supplier, discarding the product, or forwarding the product to a production station for reconfiguration.

Furthermore, in accordance with one embodiment, a method for reconfiguration of manufactured products with one or more units that incorporate technology in a skilled area comprises: downloading from a server software compatible with a desired configuration revision associated with a unit that has been incorporated into a manufactured product comprising at least one unit, including this unit, that incorporates technology in a skilled area, the software being substantially instantly accessible once developed and written in the server, and writing the downloaded software to the unit. Such method may further include attaching a configuration label to the reconfigured product, and obtaining the desired configuration revision by prompting an operator to select a customer and then obtaining the desired configuration revision associated with the customer from the server.

In these embodiments, various possible attributes may be present. The data retrieval component may include a scanner, a bar code reader, a keyboard, a key pad, a pointing device such as a mouse, a voice recognition device, or a combination thereof. The printing device may include a printer, a label maker, a bar code maker, or a combination thereof. The unit may be a subassembly such as an intermediate frequency, a radio frequency local oscillator, a transceiver, a power module, a diplexer, or a mechanical subassembly. Retrieval from the unit and from the pick up slip may include the use of a data cable, an optical link, a universal serial bus, a fire wire cable, a wireless link, or a combination thereof.

One application for these configuration verification and reconfiguration stations is in the manufacture of a wireless radio system, particularly one that operates in the microwave frequency range. Thus, the systems and methods may be adapted for manufacture of an outdoor unit of a split-mount wireless radio system.

These and other features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION

Figure 1A:
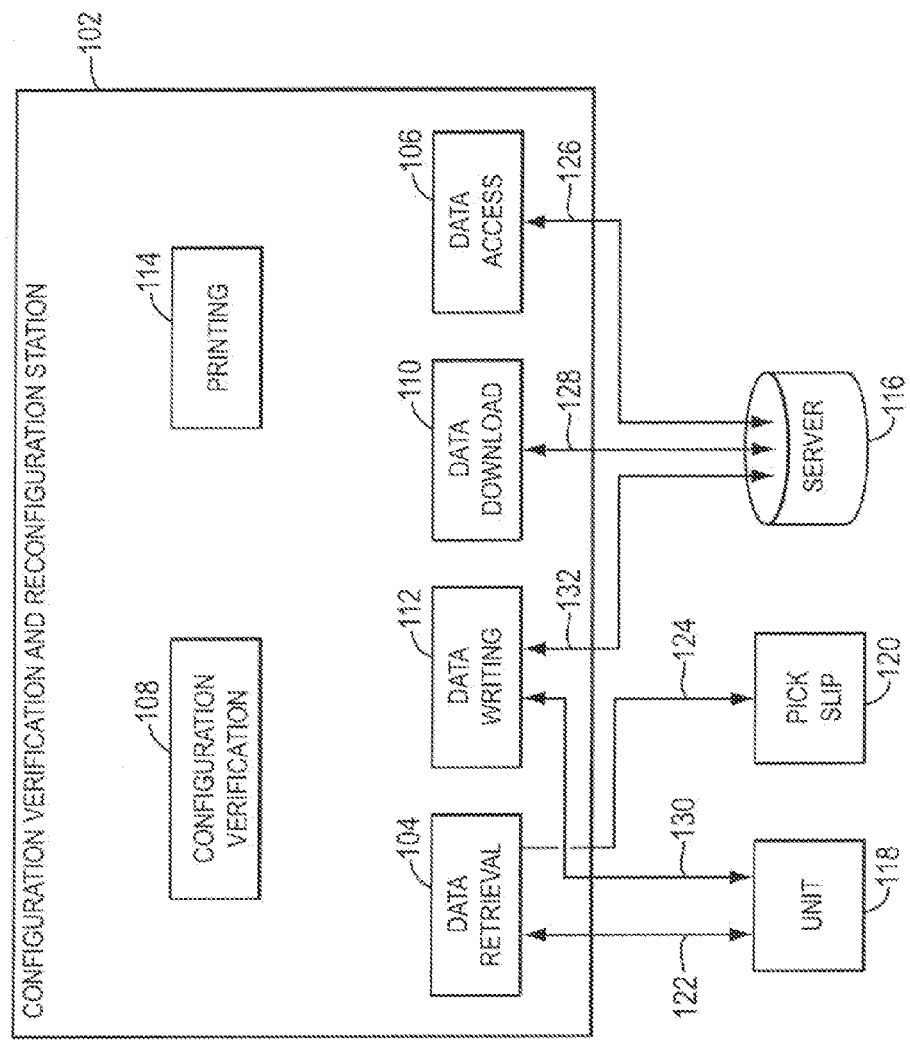
FIG. 1A illustrates a configuration verification and reconfiguration station according to one embodiment of the present invention.

As mentioned, the present invention contemplates a design approach for verifying configurations of manufactured products and for reconfiguring such products, typically prior to shipment. The design may be implemented as a configuration verification and reconfiguration station. Such station is often part of a manufacturing process and is typically positioned at a stage following completion of assembly. The station may be positioned prior to a pack-out station that prepares the product for shipment to a customer or at a customer repair or field service department for troubleshooting products returned from a customer. The functions of such a station may generally be divided into two categories, namely control over the product, and control over the station itself.

The first category of functions includes control over a manufactured product involving verifying configuration data associated with one or more units incorporated into such product as well as top level product data associated with the product once fully assembled. Upon receipt of a product, the configuration verification station obtains information from a server. Examples of such information includes an actual configuration revision, a desired configuration revision of the unit or of the product, or a combination thereof. Moreover, such obtained information may include pick slip data, which may include the desired configuration revision. If the product, including all units incorporated therein, are properly configured, the verification is successful. The product may then be forwarded for shipment to the customer as a newly purchased unit or as a unit having been repaired or otherwise serviced following an earlier shipment of the product to the customer. If the verification is unsuccessful, the configuration verification station typically displays an error message to the operator.

The station may also guide the operator to take remedial action. For example, if the verification fails because a software revision is incorrect, the operator may be guided to have the product reconfigured, for example, by having a different software revision installed on the unit. Reconfiguration may be performed on a separate station or on a combined configuration verification and reconfiguration station. If the unit fails verification because the hardware configuration is incorrect, the operator may be guided to have the incorrectly configured hardware unit replaced with a properly configured unit.

During processing of the product, the station collects data. The station may write collected data in the server, to memory in the one or more units incorporated into the product, or both. Collected data may include a new or updated configuration revision.

The second category of functions includes control over the station itself. As noted, the station may include multiple functions, for instance, verification as well as reconfiguration. Alternatively, the station may comprise two or more separate stations, for example, a separate configuration verification station and a separate reconfiguration station. Even if the station performs substantially only one function, its configuration may depend on the tasks to be performed. For example, a station may be adapted to verify configuration of microwave radio systems one week and of medical devices the following week. The company may also wish to alter the functions of the station, for example, by adding, deleting or modifying a process step. To that end, the station may download and install from the server revised software, instructions, and specifications to be used on the station itself. Alternatively, download and installation may be initiated from a remote company location.

A company may be an entity for which the products are being manufactured, and it may be the entity that drives demand for products to be manufactured by a CM (contract manufacturer) and that pays the CM for such manufactured products. A company may be the entity owning the product design. Such company may also be the entity for which a particular product is being manufactured under OEM (original equipment manufacturer) branding. A company may perform its own manufacturing, for example, at its own manufacturing plant. In such a case, there is no third party CM, and the company and the CM may essentially be one and the same entity. In other situations, the company and the CM may be different entities but belong to the same parent entity. For example, the company nay be a U.S.-based subsidiary and the CM a China-based subsidiary of the same parent entity. In such a situation, whether the company and the CM are treated as two different entities or as a single entity may depend on how demand is driven, payments are made, and confidential and proprietary information is shared between the two subsidiaries. A company and a CM are typically, but not necessarily, separate from suppliers of components and subassemblies to be incorporated into manufactured products and from suppliers of the equipment used in the manufacturing process. This may also apply to customers, i.e., entities purchasing the manufactured product from the company.

The preferred approach to designing a system for configuring products following manufacturing (e.g., prior to shipment, during field service following shipment) therefore includes controlling the configuration process and guiding the operator to take remedial action, it possible, if an incorrectly configured product is detected. The approach will preferably achieve the goal of substantially increasing accessibility of data by storing data in a server and making the design portable to multiple manufacturing plants. A design using this approach is particularly useful in the configuration of an outdoor unit of a split-mount microwave radio system.

This design approach has taken into consideration the beneficial aspects as well as deficiencies of various manufacturing system designs. One such design may include manually collecting, on paper, data associated with the product. For example, data collected manually may be logged on a traveler card that follows the unit on the manufacturing line, with the card being stamped at each production station and capable of being annotated by the operator. The card is typically archived and may be retrieved to review the data at a later time. Other data may be collected electronically, for example, on a local computer (e.g., coupled to a stand-alone station) or in one or more databases on a computer system.

Additionally, such design may include developing, at company headquarters, new revisions of software, instructions, and specifications to be used on the configuration verification and reconfiguration station. Once released, such new revisions may be transferred, for example, to a remote manufacturing plant (e.g., a CM's plant) via mail (e.g., on CD-ROM), e-mail, FTP (file transfer protocol), or the like.

As a further alternative, such design may include manual verification that the proper part number, configuration revision, branding, and so forth are incorporated into the fully assembled product to be shipped. A human error in the verification may not necessarily lead to the product's failing subsequent tests, depending on which incorrect unit or undesirable configuration was actually used. A product thus assembled, even if it passes pre-shipment configuration verification, may nonetheless fail in the field.

Moreover, in some design approaches, a customer's order may be filled by first assembling all products in a single (e.g., predefined) configuration. All or a subset of such assembled products may then be reconfigured to conform to, for example, a downgrade in the software revision with such products being later used as spares or replacements for the customer's existing installation of products. Another subset may be reconfigured to private labeling. The foregoing approaches each addresses one or more aspects of verification, reconfiguration, and data collection albeit not necessarily simultaneously in the same configuration verification and reconfiguration station or based on a design that lends itself to configuring products incorporating skilled areas of technology without the need of specialized technical capabilities at the manufacturing plant.

Thus, a preferred approach generally includes electronic collection and storage, in a server, of substantially all information, including manufacturing data, software, instructions, and specifications used, generated, and updated and making such information accessible to multiple production stations in the manufacturing plant as well as, preferably, to the company headquarters. The preferred approach further includes a configuration revision station and a reconfiguration station, each adapted to guide the relatively low-skilled operator in the processing of the manufactured product incorporating highly skilled technology.

To illustrate various aspects of the present invention, FIG. 1A is a block diagram of a configuration verification and reconfiguration station 102 according to one embodiment of the present invention. The configuration verification and reconfiguration station 102 comprises a data retrieval component 104, a data access component 106, a configuration verification component 108, a data download component 110, a data writing component 112, and, optionally, a printing component 114. In some embodiments, the station 102 is a PC (personal computer) or other computerized system. In various embodiments, one or more components of the station 102 may be automated, i.e., require input or supervision by a human being (e.g., an operator). In some embodiments, one or more components of the station 102 may be automatic, i.e., require no input or supervision by the operator. In yet some embodiments, one or more components of the station 102 may be performed manually, for example, retrieving and storing data on the traveler card.

The data retrieval component 104 is operative to retrieve data from a unit 118 and from a pick slip 120. The unit 118 is incorporated into a product comprising multiple units. A unit 118 may include a component (e.g., an integrated circuit or an FPGA (field programmable gate array)), a subassembly, or a partially assembled product. In some embodiments, the data retrieval component 104 may include any input device adapted to retrieve data by annual input (e.g., typing) or automated input (e.g. selection from a menu by the operator or by recognition of the operator's voice), or a combination thereof. Examples of input devices may include a scanner or a bar code reader, a user input device, such as a keyboard, a key pad, a pointing device such as a mouse or the like.

The retrieval is accomplished by operatively connecting the unit 118 and the pick slip 120 to the data retrieval component 104 via communications links 122 and 124, respectively. In some embodiments, one or more of the communications links 122, 124 comprises an optical link, for example, the link established using a scanner or bar code reader. In some embodiments, one or more of the communications links 122, 124 comprises a data cable, for example, a serial RS-232 cable, a cable including a parallel port, a USB (universal serial bus) or fire wire cable a wireless connection such as Bluetooth, or the like. In some embodiments, the communications link is omitted (e.g., not necessary). For example, when the operator retrieves the data by looking at the unit or pick slip after which the operator enters the data by typing it in or by giving a voice command to the data retrieval component 104, there is essentially no communications link between the unit or pick slip, per se, and the data retrieval component 104. However, a communications link such as a data cable may still be necessary to operatively connect the keyboard or the voice recognition device with, for example, the data retrieval component PC (not shown in FIG. 1A). Data retrieved from the unit 118 typically includes an actual configuration revision, a desired configuration revision, or both. Data retrieved from the pick slip 120 typically includes the desired configuration revision.

A desired configuration revision may include a predefined configuration revision. The predefined revision may be associated with a customer, with a top level part number of the product, or the like. Alternatively, a desired configuration revision may include a required configuration revision. Examples of required configuration revisions include those associated with a destination to which the product is to be shipped. Some destinations require compliance requirements with, for example, country-specific standards and regulations. The desired configuration revision may further include configurations the company designing, manufacturing, or selling the product regards as desirable, mandatory, or both. For example, the company may regard it as desirable to configure the product to include functionality, performance, capabilities, and so forth no greater than those licensed by the customer.

As applied to microwave radio products, for example, the company may have multiple software revisions available for licensing. The customer may have a software license with a stated maximum throughput lower than the maximum throughput available in the company's most recent software revision.

The desired configuration revision may also include elements that are not directly software related. For example, the desired configuration may include private labeling to be included (e.g., embossed) on a top cover of the product. Such element of the configuration revision (actual, desired, or both) may be identified by a check box on the traveler card. In some manufacturing systems, such elements may be identified as a flag, a character, or set of electronic bits stored in the server 116, in memory included on the unit 118, or both. By obtaining the desired configuration revision, the station 102 may be adapted to guide the operator to replace an incorrectly configured unit with a properly configured unit. For example, the properly configured unit may be a different part number comprising hardware (e.g., the top cover) that includes the desired private labeling. Following replacement, the operator may be guided to continue with the verification until the configuration of substantially all units incorporated into the product has been successfully verified.

The data access component 106 is operative to obtain data associated with the unit 118, with the product, and with the pick slip 120 from a server 116 via communications link 126. Such data typically includes an actual configuration revision, a desired configuration revision, or both.

As illustrated in FIG. 1A, the configuration verification and reconfiguration station 102 interfaces with the server 116. However, the server 116 is not included as part of the station 102 itself. A server typically functions as a data repository and data service system. Such system therefore may include a server, a database, a data storage, a data retrieval device, or a combination thereof. The server 116 may comprise one or more servers. For example, the server 116 may comprise a PLM (product lifecycle management) server, which in turn may include an ERP (enterprise resource planning) server, a CRM (customer relationship management) server, an SCM (supply chain management) server, and the like. Examples of such servers include server hardware and software promoted by companies such as Agile Software Corporation, Oracle Corporation, SAP AG, SAP America, Inc., Autodesk, Inc., and others.

The server 116 may further include an LIA (licensing information application) server. The LIA server or any other portion of the server 116 may be developed by the company or by one or more CMs. The LIA server may be used to track licensing of software, for example, revisions and configurations per customer of, for example, radio software for microwave radios. Data associated with the tracking of licensing includes license terms and options, which may depend on, for example, a number of units manufactured or a radio capacity licensed by the customer. The customer may upgrade its licensed radio capacity, for example, from 4E1 to 8E1, in one or more of the configurations of manufactured radios that the customer purchases.

The server 116 may also be adapted to store a variety of data associated with individual stages of the manufacturing process, including BOMs (bills of materials), configurations, test results, calibration files, data associated with production control, scheduling, workflow management, quality control, inventory, supply chain planning, and financials, such as a general ledger, accounts payable, etc. The server 116 may be further adapted to store software compatible with desirable configuration revisions of the unit 118, as well as software, instructions, and specifications to be downloaded, installed, and executed on the configuration verification and reconfiguration station 102.

The data associated with the assembled product, as such, may include top level product data, such as a top level part number and a top level serial number, and the BOM. The data associated with an individual unit 118 may include a supplier part number, a company part number, a CM part number, a serial number, a configuration revision, a calibration file, branding data (e.g., identifying whether to include private labeling also known as OEM branding, standard company branding, or no branding), customer identification data, and the like. The data associated with the pick slip 120 may include customer identification data such as a customer name and customer number, a ship-to address, special packaging instructions, and the like.

The communications link 126 may include a LAN (local area network), a WAN (wide area network), an optical fiber, a microwave link, Ethernet, the Internet, Wi-Fi, a private line, a leased line, or the like. In some embodiments, the communications link 126 may include a firewall, a VPN (virtual private network), or the like adapted to restrict access to select users (e.g., on an individual basis or on a basis of job function).

The configuration verification component 108 is operative to compare the retrieved data from the unit 118 and the pick slip 120 with the data obtained from the server 116. The comparison typically includes verification of the actual configuration revision by comparison with the desired configuration revision. Verification may include comparing multiple configuration revision elements. For example, the verification may include checking whether the software revision of a unit 118 incorporated into the fully assembled product matches that on the pick slip 120, whether calibration files associated with the units 118 are compatible among each other and match the desired configuration associated with the top level product data, and whether the configuration of each of the units 118 is consistent with the licensing information associated with the customer. The verification may further include checking obtained information against information associated with the pick slip 120. Such checking may include whether the country of destination permits operation in the frequency band for which a microwave radio product is configured.

The configuration verification component 108 is further operative to generate an output based on the comparison. The response may include a success output and a fail output. If the compared data fails to match or is otherwise incompatible, the configuration verification component 108 may stop further processing of the product and generate the fail output. The fail output may include an error message displayed to the operator. Examples include an error message in text on a display, another visual error message such as a change of color of a light from, for example, green to red, or from a light turned off to a blinking light. If the compared data matches or is otherwise compatible, the configuration verification component 108 optionally generates and outputs the success output, and the processing is permitted to proceed.

The configuration verification component 108 is also adapted to prevent a manual override and to guide the operator to take remedial action, if possible. The guidance may be via voice or visual prompt. For example, if the software configuration revision is found to be undesirable (e.g., incorrect, incompatible, incomplete), the operator may be guided to have the unit reconfigured. Reconfiguration may be performed on a separate reconfiguration station or on a combined configuration verification and reconfiguration station. In the latter embodiment, the data access component 106 may download software compatible with the desired configuration from the server 116 for installation oil the unit 118, as further described below. A unit 118 may also, or alternatively, have an undesirable configuration not capable of remedying via software reconfiguration. Examples include a mechanical subassembly or other hardware unit, such as a top cover that includes OEM branding in the form of an embossed logo. The operator may then be guided to take remedial action by replacing that unit with a differently configured unit, such as a unit having standard or no branding.

The configuration verification component 108 may, thus, optionally be operatively connected to an output device, an input device, or both. The input device allows the operator to select the remedial action to be taken in response to the error message displayed on the output device. Examples of output devices include a display and a light source. Examples of input devices include a keyboard, a key pad, a pointing device such as a mouse, a voice recognition device, or a combination thereof. Such output and input devices are not shown in FIG. 1A.

In some embodiments, the configuration verification component 108 may optionally be adapted to perform some testing as part of the verification. Such testing may include, for example, performing actual measurements of parameters associated with the actual or desired configuration revision, such as frequency band.

The data download component 110 is operatively connected to the server 116 via communications link 128 and adapted to download software compatible with the desired configuration revision from the server 116. The downloaded software may include software associated with one or more units 118 or associated with the top level product data. In some instances, software compatible with more than one element of the configuration revision may need to be downloaded. In some embodiments, the data download component 110 may be adapted to download software compatible with more than one element of the desired configuration revision at the same time, for example, in parallel. In other embodiments, the data download component 110 may be adapted to download such software sequentially, for example, one at a time.

The data writing component 112 is operative to write data in the server 116 via a communications link 128. Writing in the server 116 may include storing and copying. The data written in the server may include data retrieved from the unit and new or updated data, for example, a new calibration file. The data written in the server typically excludes data obtained from the server by the data access component 106. The data writing component 112 is further operative to write data to the unit 118 via communications link 130. Writing to the unit 118 may include copying and installing. The data written to the unit may include a new (e.g., the desired) configuration revision itself, software compatible with the new configuration revision, a new calibration file, new branding data, and the like. The data written to the unit may further include data obtained from the server. Such data may be written to for example, EEPROM (electrically erasable programmable read only memory) in the unit 118.

The printing component 114 is optional. It is operatively connected to a peripheral printing device and adapted to transfer data retrieved, accessed, generated, and updated by one or more components of the station 102 to the printing device. The printing device may comprise a laser jet, a label maker, a bar code maker, or a combination thereof. The printing device is not shown in FIG. 1A.

In some embodiments the configuration verification and reconfiguration station 102 is operatively connected to a peripheral device other than the printing device. An example of such devices includes an IF (intermediate frequency) card fixture in which the unit 118 is disposed. Other examples include instruments such as a spectrum analyzer, a power meter, a data logger or the like. In embodiments in which the configuration verification component 108 is adapted to perform actual measurements of parameters such as, for example, a frequency configuration as part of its verification, one or more of such instruments may be included.

Various embodiments include devices operatively connected to multiple components of the configuration verification and reconfiguration station 102. For example, a data logger may be operatively connected to the data retrieval component 104 as well as to the data writing component 112.

Communications links 124 and 130 are substantially similar to communications link 122, and communications links 128 and 132 are substantially similar to communications link 126.

The aforementioned server 116 is typically part of an infrastructure of the manufacturing system. Such infrastructure may be installed at the headquarters or at the manufacturing plant of the company or one or more of the CMs. In some embodiments, the server 116 comprises multiple servers, which may be installed at more than one location or operated by more than one entity (e.g., by the company as well as one or more CMs).

The manufacturing system may include multiple configuration verification and reconfiguration stations 102. Example include at least one such station 102 at the manufacturing plant and at least one such central configuration verification and reconfiguration station 102 at the company headquarters. In some embodiments, such central station 102 may be a combined station, for example, a combined central configuration verification, reconfiguration and development station adapted to also develop new revisions of software, instructions, and specifications for use on the configuration verification and reconfiguration station 102 at the manufacturing plant.

In some embodiments, some data stored in the server 116 may include restricted access data, such as restricted access read-only data, restricted access read-and-write data, or a combination thereof. Such stored data may be restricted to some users, to some stations 102, or both. For example, new revisions of software, instructions, and specifications being developed at the company headquarters may be stored in the server 116 and designated read-and-write data with restricted access to development engineers. Upon release to the manufacturing plant, such new revisions may be designated read-only data in the server 116. In addition, the restricted access designation may be removed or changed to include, for example, some or all users or stations at the manufacturing plant. Access to and retrieval of restricted access data may be implemented on the station (e.g., on the station 102 or on a PC used for development at the company headquarters), for example, by the use of username and password.

In the embodiment of FIG. 1A, both configuration verification and reconfiguration are performed by a single station 102. In the embodiment illustrated in FIG. 1B, substantially the same functionality is performed by separate stations, i.e., a configuration verification station 102a is operatively connected via a communications link 134 to a reconfiguration station 102b, according to one embodiment of the present invention.

The configuration verification station 102a comprises a data retrieval component 104, a data access component 106, a configuration verification component 108, and, optionally, a printing component 114. These components are operatively connected and adapted substantially the same as described in connection with FIG. 1A.

The configuration verification station 102a further comprises a data writing component 112a operative to write data in the server 116 via communications link 132. The data writing component 112a is further operative to write data to the unit 118 via communications link 130a. The data written in the server 116 and to the unit 118 includes data obtained by the data retrieval component 104 and by the data access component 106 as well as data generated and updated by the configuration verification component 108. The data written typically excludes software compatible with desired configuration revisions, because such data is typically written to the unit 118 by the data download writing component 112b included in the reconfiguration station 102b, as further described below.

The reconfiguration station 102b comprises a data download component 110 operatively connected and substantially the same as described in connection with FIG. 1A. The reconfiguration station 102b further comprises a data download writing component 112b operative to write data to the unit 118 via communications link 130b. The data written includes software downloaded by the data download component 110, such as software compatible with one or more desired configuration revisions. The data written typically excludes data obtained by the data retrieval component 104 and the data access component 106 and further excludes data generated or updated by the configuration verification component 108, because such data is typically written to the unit 118 by the data writing component 112a included in the configuration verification station 102a.

Communications links 130a and 130b are substantially similar to communications link 130, and communications link 134 is substantially similar to communications link 126.

The manufacturing system may include one or more configuration verification stations 102a and one or more reconfiguration stations 102b. For example, it may be substantially more likely that a product processed by the configuration verification station 102a passes than fails. If so, the reconfiguration station 102b may be shared between multiple configuration verification stations 102a. In some embodiments, the reconfiguration station 102b may be physically located some distance from the one or more configuration verification stations 102a. For example, the manufacturing process may be separated such that products failing the configuration verification, and thus identified for reconfiguration, are cumulated over some period of time (e.g., a day, a shift) or until some number of products has been cumulated, at which point such products are processed by the reconfiguration station 102b. Following reconfiguration, such products may be returned for re-verification at the one or more configuration verification stations 102a.

The manufacturing system may include for example, one or more configuration verification stations 102a at the manufacturing plant and at least one such central station 102a at the company headquarters. The central station 102a may further be adapted to store, execute, and test revisions of software, instructions, and specifications prior to release of such revisions to the configuration verification station 102a at the manufacturing plant. In some embodiments, such central station 102a may further be operative to develop such revisions prior to release.

Likewise, the manufacturing system may include, for example, one or more reconfiguration stations 102b at the manufacturing plant and at least one such central station 102b at the company headquarters. The central station 102b may further be adapted to store, execute, and test revisions of software, instructions, and specifications prior to release of such revisions to the reconfiguration station 102b at the manufacturing plant. In some embodiments, such central station 102b may further be operative to develop such revisions prior to release.

In some embodiments, some data stored in, for example, the server 116 includes restricted access data substantially the same as described in connection with FIG. 1A. In some exemplary embodiments, the configuration download station 102b at the manufacturing plant has access only to read-only data from the server 116, whereas the configuration verification station 102a has access only to read-only data from, for example, the LIA server but to read-only as well as to read-and-write data from the server 116 (other than the LIA server component thereof).

Separating the configuration verification from the reconfiguration into stations 102a and 102b allows for simplifying training of operators. For example, some operators may be trained solely in the use and operation of the configuration verification station 102a, others solely in the use and operation of the reconfiguration station 102b, and others in the use and operation of both stations. As described above, the stations 102a 102b are adapted to process a product in accordance with the software, instructions, and specifications installed on such stations, which may include customizations depending oil part number, company, customer, branding or the like. The training of operators may thus further be simplified by training some operators in the use and operation of such of stations 102a that are adapted to process certain types of product, while training other operators in the use and operation of such of stations 102a that are adapted to process other types of product. The same applies to training in the use and operation of the reconfiguration station 102b. Such separation thus allows for the use of relatively low-skilled operators and for a shorter time to train operators during, for example, a new product introduction phase.

Figure 1B:
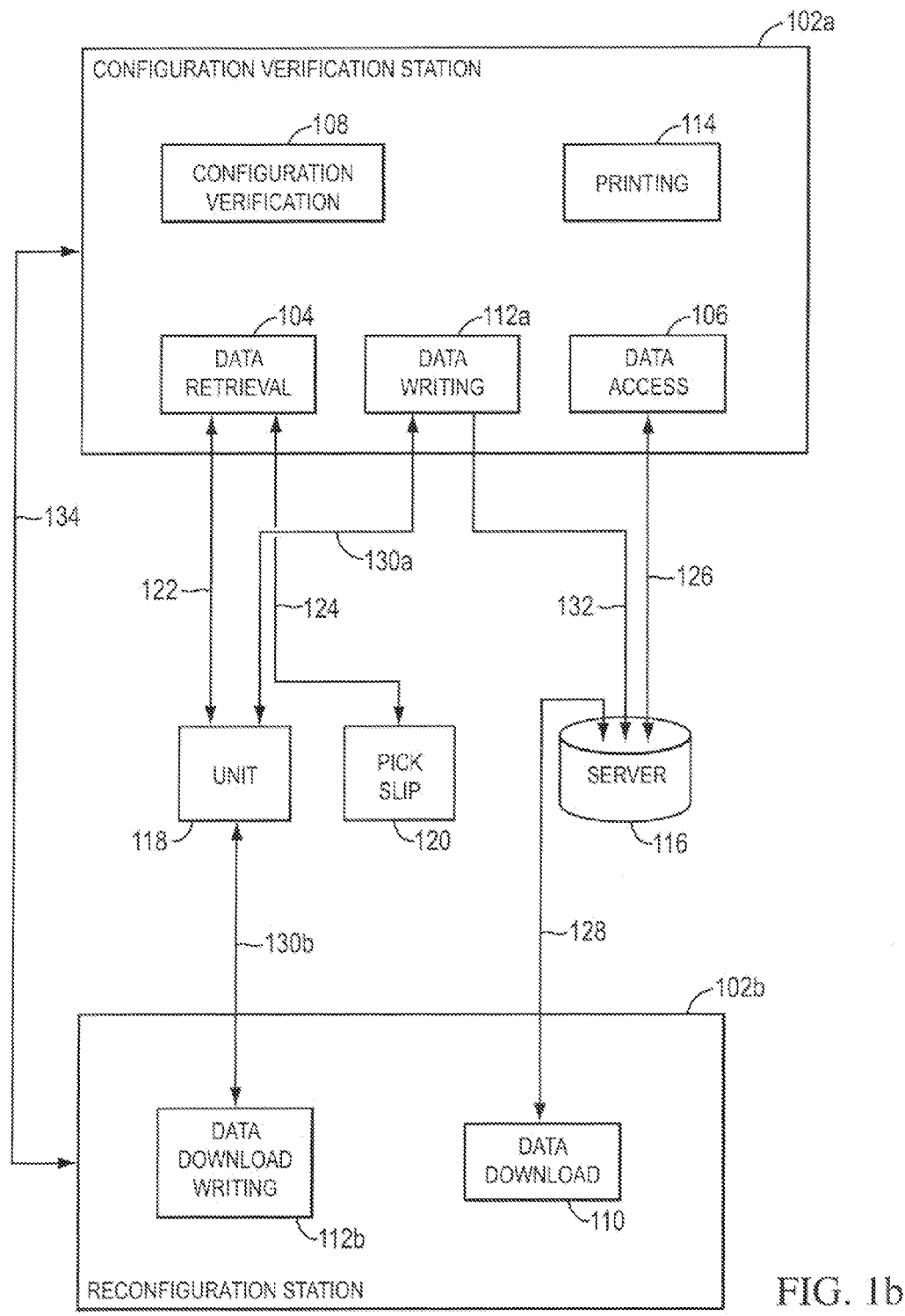
FIG. 1B illustrates a configuration verification station operatively connected to a reconfiguration station according to one embodiment of the present invention.
Figure 1C:
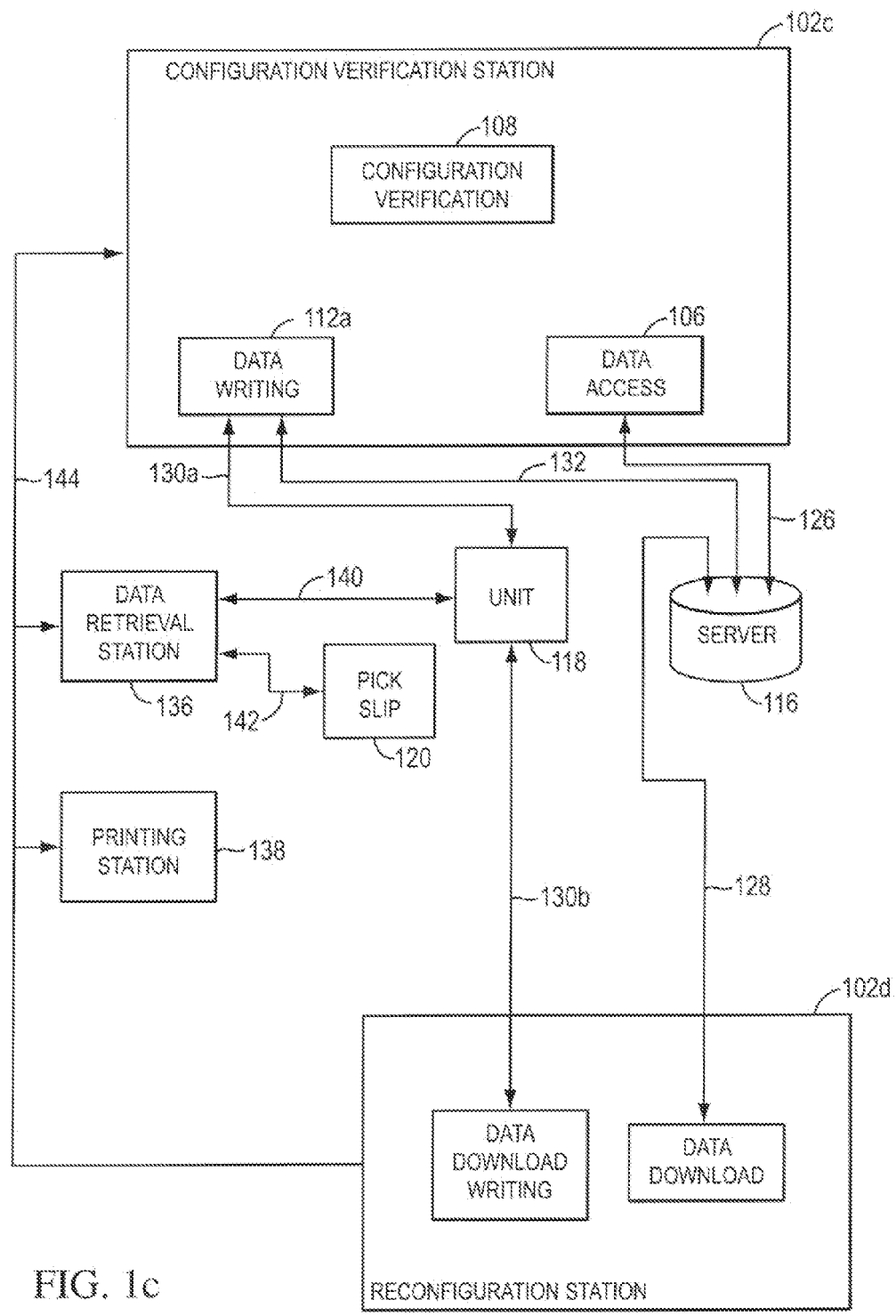
FIG. 1C illustrates a configuration verification station operatively connected to a reconfiguration station according to another embodiment of the present invention.

FIG. 1C is a block diagram of a configuration verification station 102c operatively connected to a reconfiguration station 102d according to another embodiment of the present invention. A communications link 144 operatively connects stations 102c and 102d. The embodiment of FIG. 1C further includes a data retrieval station 136 and an optional printing station 138, each operatively connected via the communications link 144 to the stations 102c and 102d.

The reconfiguration station 102d is operatively connected and adapted substantially the same as the reconfiguration station 102b (FIG. 1B). The data retrieval station 136 is adapted and operatively connected to the unit 118 and to the pick slip 120 substantially the same as the data retrieval component 104 (FIGS. 1a and 1b). The printing station 138 is adapted and operatively connected to a printing device substantially the same as the printing component 114 (FIGS. 1a and 1b).

The configuration verification station 102c comprises a data access component 106, a configuration verification component 108, and a data writing component 112a, each adapted and operatively connected substantially as described in connection with FIG. 1B. The communications link 144 is substantially similar to communications link 134.

In some embodiments, the data retrieval station 136 may be operatively connected only to the configuration verification station 102c via a separate communications link (not shown). In some embodiments, the configuration verification station 102c and the reconfiguration station 102d may be operatively connected via communications link 144, and one or both stations 102c and 102d may be further operatively connected to the printing, station 138 via one or, more separate communications links (not shown). Operatively connecting the reconfiguration station 102d to the printing station 138 may be advantageous during development and testing of new revisions of software, instructions and specifications, (or example, at a central reconfiguration station 102d operated by the company's development engineers. In some embodiments, the reconfiguration station 102d may not be operatively connected to the printing station 138. An example includes a system in which the station is 102d disposed at the manufacturing plant.

Those skilled in the art will recognize that various components of, for example, the configuration verification station 102c and the reconfiguration station 102d may be disposed in one or more separate stations, and that the embodiment in FIG. 1C illustrates but one variation of the embodiment of FIG. 1B.

Figure 2:
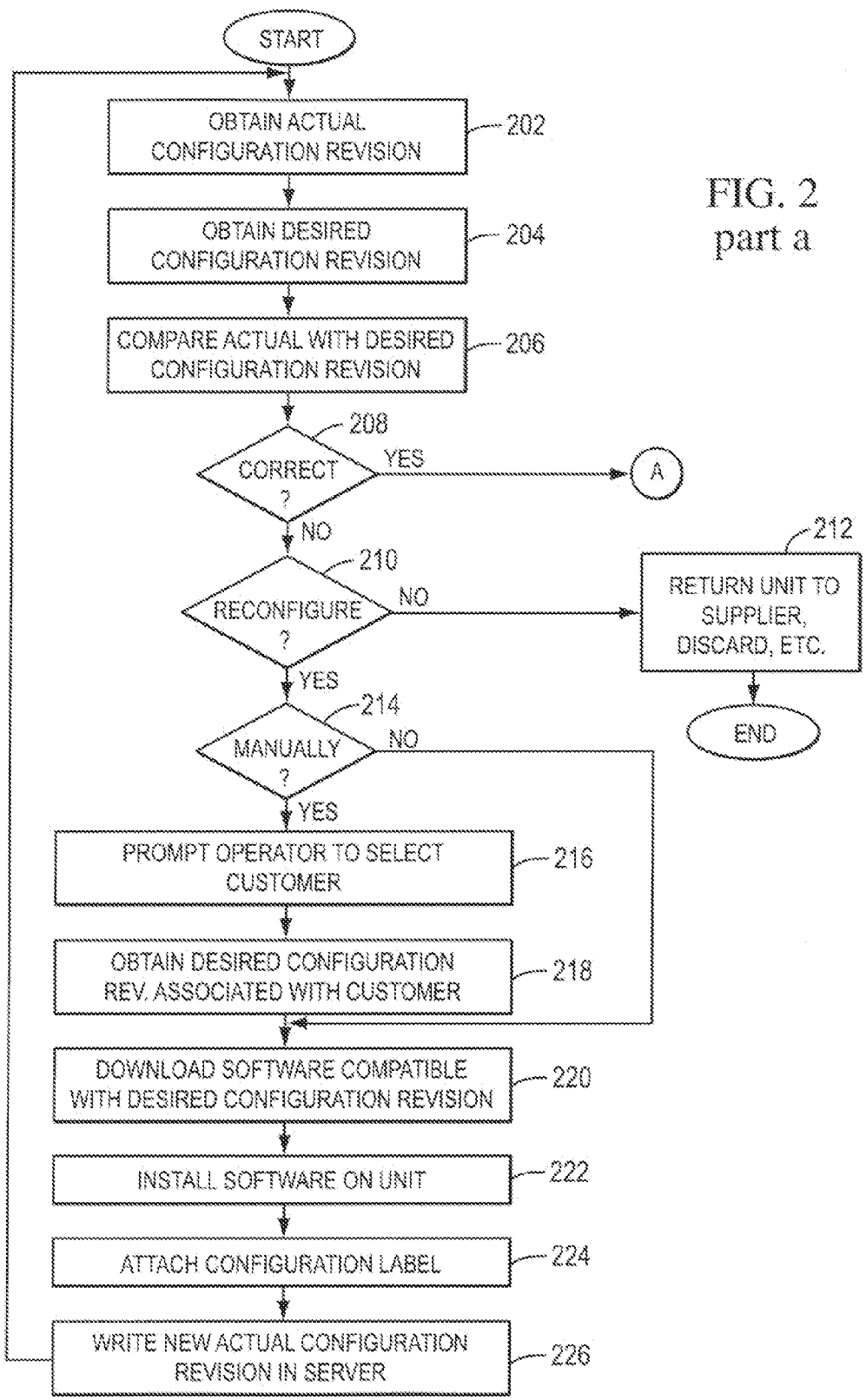
FIG. 2 is a flow diagram of an exemplary method for verifying a configuration of a product following manufacturing and, if necessary, reconfiguring the product, according to one embodiment of the invention.
Figure 2:
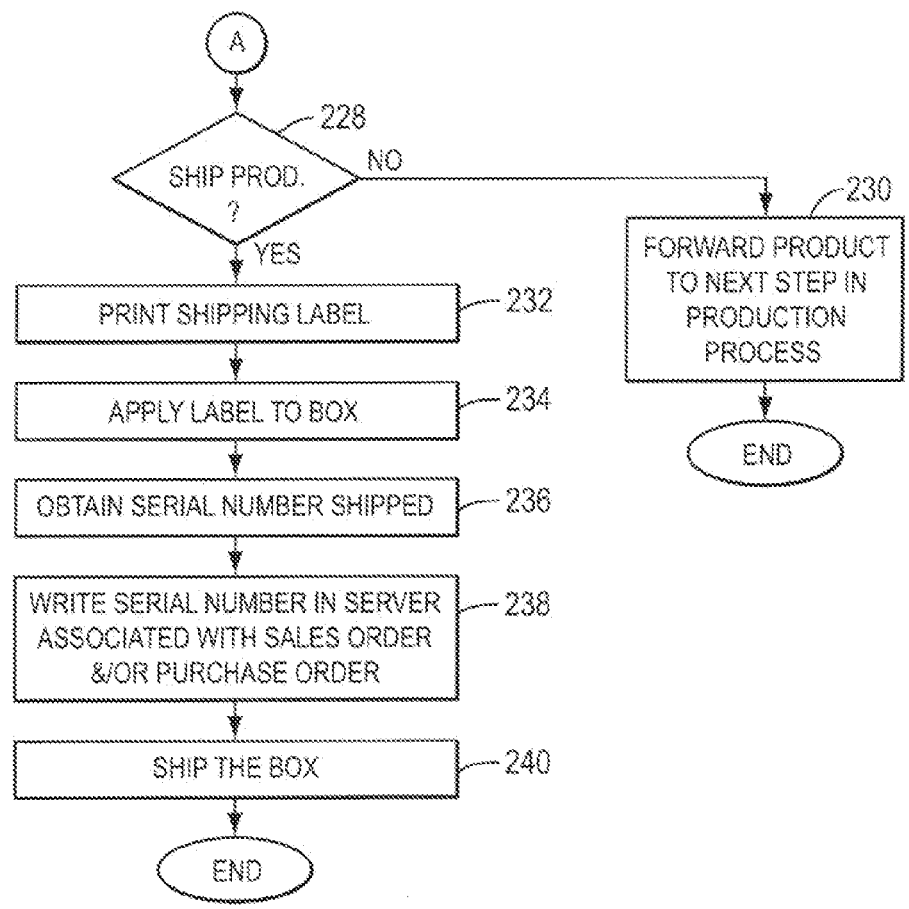

FIG. 2 is a flow diagram of an exemplary method for verifying a configuration of a product following manufacturing and, if necessary, reconfiguring the product, according to one embodiment of the invention. According to this method, the product arrives for verification prior to shipment, for example, from FGI (finished goods inventory) or from the final production station in the process flow. Alternatively, the product arrives for verification following shipment, for example, as part of customer repair, or as part of troubleshooting an installed product as part field service.

The verification starts at step 202 by obtaining an actual configuration revision associated with a unit or with the product. Such obtaining may include, for example, retrieval using a scanner or bar code reader or otherwise inputting the actual configuration revision by entering it via keyboard, key pad, or pointing device such as a mouse. Alternatively or additionally, such obtaining may include accessing the server to obtain the actual configuration revision.

At step 204, a desired configuration revision is obtained. The desired configuration revision may be obtained, for example, from a pick slip in hardcopy format by examining it (e.g., looking at it) or by scanning it. The desired configuration revision may also be obtained by accessing data associated with the pick slip in the server and displaying such data to the operator. The desired configuration revision may further be obtained by accessing a predefined configuration revision associated with the customer to which the product is to be shipped, for example, from a customer table stored in the server.

At step 206, the obtained actual configuration revision is compared with the obtained desired configuration revision. If they match or are otherwise compatible, at step 208, a success output is optionally generated and displayed to the operator. If, however, they do not match or are otherwise incompatible, a fail output (e.g., an error message) is generated and displayed at step 208. A manual override of an unsuccessful comparison at step 208 is typically not possible.

At step 210, a determination is made whether or not to reconfigure the unit. In some exemplary methods, the determination may be made automatically, for example, by the software running on the station 102. Alternatively, the determination may be made in an automated fashion, such as by allowing the operator to make a selection from one or more options available (e.g., from a menu displayed on the station). Furthermore, the determination may be made manually, for example, by allowing the operator to use his own judgment, typically based on the information available to him in hardcopy, electronic, or other format. In various embodiments, a combination of automated and manual determination may be used.

If the determination is made not to reconfigure the product, at step 212, the product that includes an incorrectly configured unit may be returned to the supplier of the unit or the product may be otherwise disposed of. For example, if the product is damaged, the product may be discarded. If, however, the product is capable of shipment to a different customer, for example, if the product includes private labeling whereas the product to be shipped is to include standard branding, the product may, for example, be returned to FGI. If the product is a product returned by the customer following shipment, for example, due to an incorrect configuration, the product may be shipped to a different customer rather than being returned to FGI. In some instances, the returned product may be shipped to the different customer as a refurbished or otherwise "used" product.

If the determination is made to reconfigure the product, the process continues at step 214, at which a determination is made whether or not to perform the reconfiguration manually. As described in connection with step 210, the determination may be made automatically, in automated fashion manually, or in some combination of automated and manually. If the determination made is not to perform manual reconfiguration, the method proceeds to step 220.

If the determination made is to use manual operation, the operator is prompted, at step 216, to select a customer. The prompt may comprise a query displayed to allow the operator to enter, for example, via keyboard, the name of the customer. The customer name may be entered, for example, by typing in a partial name such as the first four characters of the customer name, a company acronym, a customer number, or the like. The prompt may also comprise allowing the operator to select the customer name from a menu, speak the name to a voice recognition device operatively connected to the station, or the like.

At step 218, a desired configuration revision is obtained. The desired configuration revision may be a predefined or a required configuration revision. Examples of obtaining such revision include retrieving it from the pick slip or from the server. The desired configuration revision obtained in step 218 supersedes that obtained in step 204, if any.

At step 220, software compatible with the desired configuration revision may be downloaded to the station 102 from the server. At step 222, the downloaded software may be installed to the unit to be reconfigured.

Step 224 is optional. At this step, a configuration label may be attached to the product, for example, to an exterior unit such as a cover or to a surface of an interior unit such as the surface readily accessible to a customer, to a distributor, or to a customer support or field service staff member of the company. If a label exists, for example, is already attached to the unit, an updated label may be attached so as to cover the existing label. Alternatively, the existing label may be removed and replaced with the updated label. If no label exists, a label may be generated (e.g., printed on a label maker) and attached to the product.

At step 226, the new (i.e., desired) configuration revision is written in the server, whereafter the method returns to step 202 for verification of the now reconfigured product that now includes the new configuration revision.

If, at step 208, the determination is made that the configuration is correct, at step 228, a determination may be made whether to ship the product. The product may be shipped to the customer both if it is a new product and if it is a product returned by the customer for troubleshooting, for example, as part of field service or customer repair. The determination is made not to ship the product, the product may be forwarded to a next step in the manufacturing process. The next step may include FGI. If the product was returned by the customer for repair, a determination may be made to scrap the product, for example, if the product is not capable of being repaired. If the determination is made to ship the product, at step 232, a shipping label may be printed and, at step 234, applied to a shipping box adapted to ship the product. At step 236, a serial number of the product to be shipped may be obtained, for example, by retrieving it from the product, by inspecting the configuration label attached in step 224, or by obtaining it from the server. At step 238, the serial number may be written in the server whereby, optionally, the written serial number becomes associated with sales order data or purchase order data associated with the product. At step 240, the box may be shipped. In some exemplary methods, the box may be shipped only once it is full or all products included on the sales order are placed inside the box. In some methods, steps 232 through 238 may be repeated before the method proceeds to step 240. In some exemplary methods, one or more of steps 232 through 238 may be optional.

In some methods, step 224 (i.e., attaching a configuration label) may be included after step 228 prior to printing the shipping label at step 232 or forwarding the unit for the next step in the manufacturing process at step 230. In some methods, only one option may be available at step 214. For example, manual reconfiguration may be prevented, prohibited, or unavailable at step 214. In such methods, steps 216 and 218 may be omitted.

In some methods, various steps may be performed in different order than that of FIG. 2. For example, step 224 may be performed prior to step 222 or in parallel with (e.g., at the same time as) step 222. Steps 236 and 238 may also be performed prior to or in parallel with steps 232 and 234.

A product may fail processing at one or more of the steps in the exemplary method. For example, a unit incorporated into the product may be unresponsive to retrieval of the configuration revision at step 202 or unresponsive to installation of the software at step 222. In such an event, an error message may be generated and output, the assembly stopped, and the operator guided to take remedial action. The flowchart in FIG. 2 does not include all possible steps at which the method may proceed to such stop or guidance. However, those skilled in the art will recognize that multiple such events are possible. A product failing processing in some manner at a step in the method may be discarded, or be forwarded to a production station for troubleshooting, for a replacement of one or more units, or the like.

In some methods, steps 214 through 226 may be omitted. An example includes a method performed on the configuration verification station 102a or 102c, i.e., on a station that includes no reconfiguration components. In such methods, at step 210, a product may either be disposed of at step 212 or forwarded to the next step in the process flow (typically FGI) at step 230.

In some embodiments, steps 214 through 226 may be performed by a separate reconfiguration station. Furthermore, steps 232 through 240 may be performed by a separate station, for example, a pack-out station.

In sum, the present invention contemplates various design approaches to address verification of configurations and reconfiguration of products incorporating skilled areas of technology. Preferably, these include storing data in a server such that the data is readily accessible to various stations used in the manufacturing process. Although the present invention has been described in considerable detail with reference to certain preferred embodiments thereof, other embodiments are possible. Therefore, the spirit and scope of the appended claims should not be limited to the description of the preferred embodiments contained herein.

We claim:

1. A station for verifying configuration of software installed on manufactured products with two or more parts, the station comprising:
   a data retrieval component operative to retrieve, from one part of the two or more parts manufactured during a manufacturing process, an actual software configuration revision of a first software installed on the one part, the retrieving the actual software configuration revision occurring during the manufacturing process or occurring after the manufacturing process but before shipping a manufactured product;
   a data access component operative to obtain from a server a desired software configuration revision of the first software installed on the one part, the data access component having substantially instant access to the desired software configuration revision once the desired software configuration revision is written to the server; and
   a configuration verification component operative to compare the actual software configuration revision retrieved from the one part with the desired software configuration revision obtained from the server, and to generate an output based on the comparison, wherein the output indicates whether the actual software configuration revision should be accepted for the one part, wherein the configuration verification component is operative to guide an operator to reconfigure the one part using the desired software configuration revision when the desired software configuration revision should be accepted for the one part, and wherein guiding the operator to reconfigure the one part includes providing the operator with a visual or voice prompt configured to guide the operator in a process of installing the desired software configuration revision on the one part.

2. A station as in claim 1, further comprising a data writing component operative to write the obtained desired software configuration revision to the server and the obtained desired software configuration revision to the one part.

3. A station as in claim 1, further comprising a printing component communicatively coupled to a printing device and operative to transfer the actual software configuration revision retrieved from the one part, the desired software configuration revision obtained from the server, and the generated output to the printing device.

4. A station as in claim 3, wherein the printing device includes a printer, a label maker, a bar code maker, or a combination thereof.

5. A station as in claim 1, wherein the data retrieval component includes a scanner, a bar code reader, a keyboard, a key pad, a pointing device, a voice recognition device, or a combination thereof.

6. A station as in claim 1, wherein the one part comprises an intermediate frequency subassembly, a radio frequency local oscillator subassembly, a transceiver subassembly, a power module subassembly, a diplexer subassembly, or a mechanical subassembly.

7. A station as in claim 1, wherein the manufactured product comprises an outdoor unit of a split-mount microwave radio system.

8. A station as in claim 1, further comprising a communications link including one or more of a data cable, an optical link, a universal serial bus, a fire wire cable, and a wireless link.

9. The station of claim 1, wherein guiding the operator to reconfigure the one part comprises providing instructions to the operator to use one or more of:
   a reconfiguration station separate from the station for verifying configuration, and a reconfiguration station combined with the station for verifying configuration.

10. The station of claim 1, wherein guiding the operator to reconfigure the one part comprises instructing the operator to replace the one part.

11. The station of claim 10, wherein the one part comprises a mechanical subassembly of the manufactured product.

12. The station of claim 10, wherein the one part comprises a hardware unit of the manufactured product.

13. The station of claim 12, wherein the hardware unit comprises original equipment manufacturer (OEM) branding, and guiding the operator to reconfigure the one part comprises guiding the operator to replace the one part with another part having non-OEM branding.

14. A method performed in a station for verifying configuration of software installed on manufactured products with two or more parts, the method comprising:
   retrieving, from one part of the two or more parts manufactured during a manufacturing process, an actual software configuration revision of a first software installed on the one part, the retrieving occurring during the manufacturing process or occurring after the manufacturing process but before shipping a manufactured product;
   obtaining from a server a desired software configuration revision of the first software installed on the one part;
   comparing the actual software configuration revision retrieved from the one part with the desired software configuration revision obtained from the server;

generating an output based on the comparison, wherein the desired software configuration revision is substantially instantly accessible to the station once the desired software configuration revision is written to the server, wherein the output indicates whether the actual software configuration revision should be accepted for the one part; and guiding an operator to reconfigure the one part using the desired software configuration revision when the desired software configuration revision should be accepted for the one part, wherein guiding the operator to reconfigure the one part includes providing the operator with a visual or voice prompt configured to guide the operator in a process of installing the desired software configuration revision on the one part.

15. A method as in claim 14, further comprising, if the actual software configuration revision is accepted, forwarding the manufactured product to a next step in the manufacturing process, printing a shipping label, or writing a serial number to the server.

16. A method as in claim 14, further comprising, if the actual software configuration revision is not accepted, returning the one part to a supplier of the one part, discarding the manufactured product, or forwarding the manufactured product to a production station for reconfiguration.

17. The method of claim 14, wherein guiding the operator to reconfigure the one part comprises instructing the operator to replace the one part.

18. The method of claim 17, wherein the one part comprises a mechanical subassembly of the manufactured product, or a hardware unit of the manufactured product.

19. The method of claim 18, wherein the hardware unit comprises original equipment manufacturer (OEM) branding, and guiding the operator to reconfigure the one part comprises guiding the operator to replace the one part with another part having non-OEM branding.

20. A station for verifying configuration of software installed on manufactured products with two or more parts, the station comprising:

means for retrieving, from one part of the two or more parts manufactured during a manufacturing process, an actual software configuration revision of a first software installed on the one part, the means for retrieving occurring during the manufacturing processor or occurring after the manufacturing process but before shipping a manufactured product;

means for obtaining from a server a desired software configuration revision of the first software installed on the one part, the means for obtaining having substantially instant access to the desired software configuration revision once the desired software configuration revision is written to the server; and means for comparing the actual software configuration revision retrieved from the one part with the desired software configuration revision obtained from the server, and for generating an output based on the comparison, wherein the output indicates whether the actual software configuration revision should be accepted for the one part, wherein the means for comparing is operative to guide an operator to reconfigure the one part using the desired software configuration revision when the desired software configuration revision should be accepted for the one part, and wherein guiding the operator to reconfigure the one part includes providing the operator with a visual or voice prompt configured to guide the operator in a process of installing the desired software configuration revision on the one part.

* * * * *